United States Patent
Brodsky et al.

(10) Patent No.: US 8,457,316 B2
(45) Date of Patent: *Jun. 4, 2013

(54) ARCHITECTURE FOR RECONFIGURABLE QUANTUM KEY DISTRIBUTION NETWORKS BASED ON ENTANGLED PHOTONS BY WAVELENGTH DIVISION MULTIPLEXING

(75) Inventors: Mikhail Brodsky, Millburn, NJ (US); Mark David Feuer, Colts Neck, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1023 days.

This patent is subject to a terminal disclaimer.

(21) Appl. No.: 12/008,952

(22) Filed: Jan. 15, 2008

(65) Prior Publication Data
US 2009/0180776 A1   Jul. 16, 2009

(51) Int. Cl.
*H04L 9/00* (2006.01)
*H04K 1/00* (2006.01)
*H04J 14/00* (2006.01)

(52) U.S. Cl.
USPC ............................ 380/278; 380/256; 398/69

(58) Field of Classification Search
USPC .................................................. 380/263
See application file for complete search history.

(56) References Cited

U.S. PATENT DOCUMENTS

| | | | | |
|---|---|---|---|---|
| 6,263,130 | B1* | 7/2001 | Barnard | 385/24 |
| 7,747,023 | B2* | 6/2010 | Bussieres et al. | 380/278 |
| 2002/0097874 | A1* | 7/2002 | Foden et al. | 380/256 |
| 2003/0156296 | A1* | 8/2003 | Englund et al. | 356/477 |
| 2004/0208638 | A1* | 10/2004 | Jansen | 398/183 |

OTHER PUBLICATIONS

Hendrych et al, Tunable control of the frequency correlations of entangled photons, 2007 Optical Society of America, OCIS codes 270.5290, 270.0270, 190.4410.*

* cited by examiner

*Primary Examiner* — Philip Chea
*Assistant Examiner* — Fatoumata Traore
(74) *Attorney, Agent, or Firm* — Wolff & Samson PC

(57) ABSTRACT

A system and method for securing communications over a wave division multiplexing optical network between a plurality of users connected to the network. The system utilizes a primary optical source generator that is either tunable, or capable of generating a plurality of wavebands of different frequencies equal to the sum of wavebands serving individual users of the network to facilitate a key exchange between the individual users of the network using summed wavebands, each of which serving an individual user.

18 Claims, 1 Drawing Sheet

Introduction of a multi-frequency laser can bring greater flexibility of QKD connections (i.e. reduced blocking).

Adjusment of the tunable source laser used for parametric downconversion can create a connection between any two end users, though some simultaneous connections may appear, depending on the set of $\omega_i$.

Introduction of a multi-frequency laser can bring greater flexibility of QKD connections (i.e. reduced blocking).

ARCHITECTURE FOR RECONFIGURABLE QUANTUM KEY DISTRIBUTION NETWORKS BASED ON ENTANGLED PHOTONS BY WAVELENGTH DIVISION MULTIPLEXING

FIELD OF THE INVENTION

The present invention relates generally to message security across optical networks through methods of encryption, and more particularly, to an approach for reconfigurable multi-user quantum key distribution (QKD) networks based on the Eckert QKD protocol. The method relies on tunability of the source laser to control the wavelengths of the entangled photon pairs. The network path to the end users is then determined by a fixed optical wavelength de-multiplexer (WDM).

BACKGROUND OF THE INVENTION

Wavelength-division multiplexing (WDM) has been employed in core networks for over a decade. WDM technology enables signals of multiple wavelengths to be concurrently transmitted over a given optical medium. This has been facilitated by the availability of wideband optical amplifiers that can simultaneously amplify many different wavelengths without distortion. The advantages provided by WDM translate into greater fiber utilization, lower capital expenditures associated with fiber deployment, and reduced costs in repeater stations by eliminating the need to terminate each wavelength along the fiber path. To maximize economic utility, the wavelength density that can be multiplexed onto a given fiber has increased in recent years: 80-wavelength systems are now common in the EDFA band, with 50 GHz frequency spacings between channels in many offerings.

Quantum Key Distribution and Networking—Message security is a critical concern in today's communication networks. Such security is usually provided through cryptography, a process in which message data is convolved with a known key to produce an encrypted message. The level of security varies with the algorithm and the key length, but security can always be improved by changing keys more frequently. In fact, the only provably secure encryption is the one-time pad, in which there is one key bit per message bit, and keys are never reused. For any encryption method, the security of the message is based on the privacy of the keys. Even the one-time pad can be broken if the keys are known to an eavesdropper. Thus, secure key distribution is the foundation of any encryption system. The classic method of key distribution is to generate keys at one site, record them on a physical medium, then transfer them via human courier to both ends of an encrypted message link. Quantum Key Distribution (QKD) removes the risks associated with courier distribution, enabling collaborative generation of secure keys at the endpoints where they are needed. Security of the process against eavesdropping is guaranteed by the no-cloning theorem, when operating in the single-quantum regime. Classic QKD algorithms, such as the BB84 protocol (Bennett and Brassard, 1984) are designed for point-to-point operation between two sites connected by a dedicated optical link. For a community of K users interconnected by optical fibers, K*(K−1) fiber pairs would be needed. Our new approaches offer a much more efficient, fiber-lean, solution for full connectivity. They also provide for dynamic sharing of the QKD bandwidth, allowing rapid expansion or contraction of the QKD rate at individual sites on an on-demand basis.

Quantum Entanglement—Quantum entanglement is a phenomenon relating the quantum states of two or more objects even when these objects are spatially separated. This phenomenon manifests itself in correlation between measurable physical properties of the entangled objects. The simplest example is a pair of polarization-entangled photons. A photon can have either vertical or horizontal polarization. For two entangled photons the polarization of each is uncertain. However, when these photons are sent to distant observers Alice and Bob, polarization measurements performed by them are correlated. That is if Alice observes a vertical polarization for her photon, Bob's photon will have a horizontal polarization or vice versa. While Alice's result is random (she does not know a priori whether her photon is horizontally or vertically polarized), polarization measurements performed by Bob always produce a result correlated with that of Alice. If a sequential stream of entangled photons is delivered to Alice and Bob, such correlation allows them to form a truly random sequence of zeros and ones that could serve as a cryptographic key for secured communication (Eckert 1991).

Creation of the entangled photons for telecom applications—The entangled photon pairs may be created by a variety of processes in which a photon from a source laser interacts with a nonlinear medium (which could be a special fiber or a waveguide structure), such as the parametric downconversion (PDC) process. In this PDC process, a primary source photon with a frequency $\omega_0$ is annihilated and a pair of entangled photons with frequencies $\omega_1$ and $\omega_2$ is created. In fact, each of the entangled photons occupies a relatively broad optical spectrum of the width BPDC centered at $\omega_1$ and $\omega_2$. Conservation of energy requires that the sum of the $\omega_1$ and $\omega_2$ is equal to $\omega_0$). BPDC could be up to few tens of nm wide (20-40 nm). Such a spectral width makes the photons unsuitable for communication through optical fibers due to deleterious effects of chromatic dispersion. Thus, the photons are filtered, which reduces their bandwidth to about BF~1 nm (or 125 GHz). To preserve the entanglement, the filters' center frequencies $\omega_{F1}$ and $\omega_{F2}$ must add up to $\omega_0$. That is, the entangled photons are equally spaced above and below the frequency of the primary source photon. One way to provide the needed filtering is the use of a wavelength demultiplexer (WDM). An entangled pair enters the WDM through a common port, one photon leaves through a port A (centered around $\omega_A$) to a fiber leading to Alice, and, in a similar fashion, the second photon is directed to Bob through port B (centered around $\omega_B$), where $\omega_A + \omega_B = \omega_0$. If another nonlinear process is used instead of PDC, the mathematical relation between the primary source frequency and the frequencies of the entangled photons may differ from that specified above, but a known mathematical relation will exist and the present invention can be used to establish QKD connection topology.

SUMMARY OF THE INVENTION

In accordance with a first aspect of the invention, there is disclosed a methodology for securing communications between a plurality of users communicating over a wave division multiplexing (WDM) network. The method generally comprises the steps of: generating entangled photon pairs at frequencies determined by the frequency of a primary optical source, where the frequency of the primary optical source is tuned; distributing entangled photon pairs among individual users according to the frequencies; and establishing a key exchange between the individual users using the entangled photon pairs distributed to the individual users over the WDM network.

In accordance with another aspect of the invention, there is disclosed a system for securing communications between a plurality of users communicating over a wave division multiplexing (WDM) network. The inventive system comprises: a tunable primary optical source for stimulating the generation of entangled photon pairs at a plurality of frequencies; and a wave division multiplexer/demultiplexer (Wmux/Dmux) communicating with the primary optical source for distributing a plurality of wavebands to the users, and for establishing a key exchange between the individual users using the entangled photons pairs.

In accordance with another aspect of the invention, there is disclosed a system for securing communications between a plurality of users communicating over a wave division multiplexing (WDM) network, comprising: a tunable primary optical source for pumping a nonlinear element; a nonlinear element for generating entangled photon pairs at a plurality of frequencies in mathematical relation to the frequency of the primary optical source; a wave division multiplexer/demultiplexer (Wmux/Dmux) communicating with the nonlinear element for distributing a plurality of wavebands to the users, and for establishing a key exchange between the individual users using the entangled photons pairs.

In accordance with yet another aspect of the invention, there is disclosed a system for securing communications between a plurality of users communicating over a wave division multiplexing (WDM) network, comprising: a memory medium containing machine readable instructions which, when executed by a processor, enable a device to secure communications between a plurality of users communicating over a wave division multiplexing (WDM) network by distributing a plurality of wavebands to the users, and establishing a key exchange between the users using the entangled photons pairs via a wave division multiplexer/demultiplexer (Wmux/Dmux), by generating entangled photon pairs at a plurality of frequencies from a tunable primary optical source or a plurality of fixed frequency optical sources.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
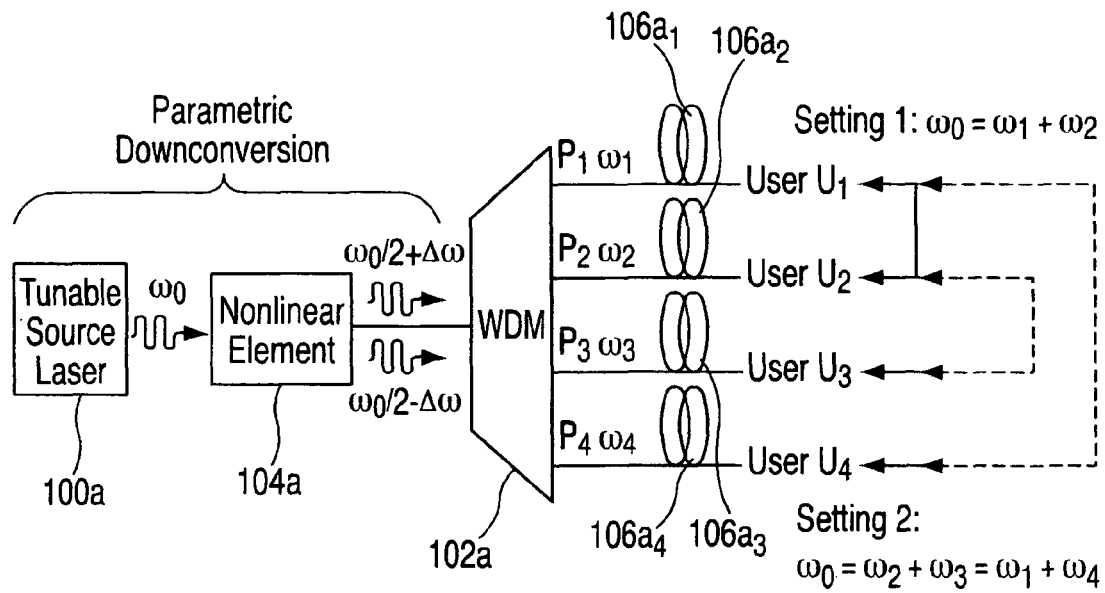
FIG. 1a is a schematic of a first illustrative embodiment in accordance with an aspect of the present invention, depicting a network architecture wherein communications between users on a WDM network are secured via Quantum Key Distribution using a tunable laser.

In accordance with a first aspect of the invention, there is provided a system and method for using entangled photon pairs to enable Quantum Key Distribution (QKD) for securing communications between a plurality of users communicating over a WDM network. In this connection and with reference to FIG. 1a, there is shown a tunable laser 100a coupled to a multiport WDM 102a via a non-linear element 104a. Laser 100a, WDM 102a and non-linear element 104a are known components in the field of optical networking. As shown in FIG. 1a, WDM 102a comprises a plurality of output ports $P_1 \ldots P_4$ that respectively couple to users $U_1 \ldots U_4$ of a WDM network.

Each port $P_i$ is connected to a user $U_i$ by an optical fiber $106a_1, 106a_2, \ldots 106a_4$, respectively. In accordance with aspects of the invention, a QKD session may be established between any two users $U_i$ and $U_j$ by tuning the source frequency $\omega_0$ of laser source 100a to the sum of the wavebands serving those users, (i.e., $\omega_i$ and $\omega_j$) such that $\omega_0=\omega_i+\omega_j$. It will be appreciated by those skilled in the art that the source frequency or waveband $\omega_i$ may actually be expressed by $\omega_0/2+/-\Delta\omega$. By tuning the laser through every combination of $\omega_i\omega_j=\omega_0$, a key exchange session can be established between every possible pair of all users. In general, if there exists two pairs of ports $\{P_i, P_j\}$ and $\{P_m, P_n\}$ such that $\omega_i+\omega_j=\omega_m+\omega_n$, then two key exchange sessions (one between $\{P_i, P_j\}$ and the other between $\{P_m, P_n\}$) can run concurrently. In such a case, each entangled pair created by the source photon $\omega_0$ goes to only one pair of users (the choice is random). Specifically, the expression $\omega_0=\omega_2+\omega_3=\omega_1+\omega_4$ represents key exchanges between ports $P_2$ and $P_3$, and between ports $P_1$ and $P_4$ that are running concurrently. However, when the parametric down-conversion (PDC) process is repeated for a stream of clocked pulses, over time both pairs of users are served with a sufficient number of the entangled pairs to form a cryptographic key (not shown). Thus, concurrent QKD connections may be sustained between multiple end-user pairs. It will thus be appreciated by those skilled in the art that the setup of one connection will affect the choice of other connections that can be implemented concurrently. This may be viewed as a partial blocking of the 'switch' comprising the QKD network. The detailed nature of this blocking can be adjusted by a judicious choice of the source wavelengths. If necessary, one or more additional tunable source lasers (not shown) can be included to reduce such blocking and increase QKD network capacity. It will further be appreciated by those skilled in the art that entangled photon pairs can be generated by degenerate four-wave mixing.

Figure 1B:
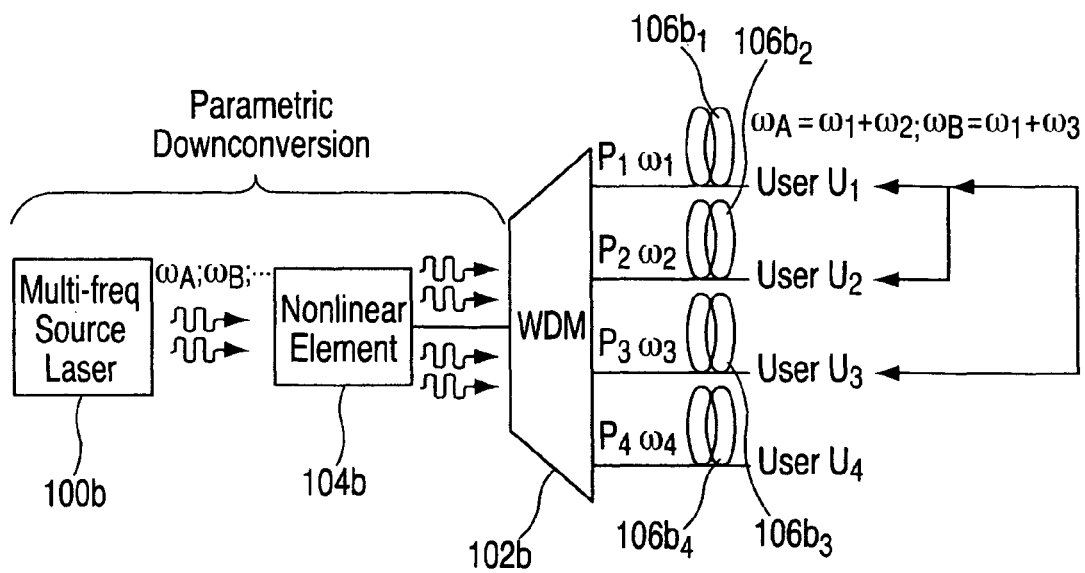
FIG. 1b is a schematic of a second illustrative embodiment in accordance with another aspect of the invention similar to that shown in FIG. 1a, where a multi-frequency laser source or multiple fixed laser sources are employed in lieu of a tunable laser.

Referring now to FIG. 1b, a multi-frequency laser source 100b or an array of fixed lasers (not shown) can be utilized in the inventive system as described above to switch individual wavelengths on and off to control the QKD. The second aspect of the invention, as shown in FIG. 1b, is similar to the first aspect of the invention in most respects (i.e., a WDM 102b comprises a plurality of input/output ports $P_1 \ldots P_4$ that respectively couple users $U_1 \ldots U_4$ to a WDM network). Similar to the expedient shown in FIG. 1a, each port $P_i$ is connected to a user $U_i$ by an optical fiber $106b_1, 106b_2, \ldots 106b_4$, respectively. The QKD can be implemented between any two users $U_i$ and $U_j$ by using a multi-frequency source laser 100b (or multiple fixed source lasers, not shown), which tunes the source frequency $\omega_A$ to the sum of the wavebands serving said users, (i.e., $\omega_i$ and $\omega_j$) such that $\omega_A=\omega_i+\omega_j$. This implementation enables concurrent sessions between one user and a plurality of users on the network.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A method comprising:
   determining a plurality of source wavelengths based on implementing a maximum number of quantum key distribution connections between a plurality of user pairs concurrently;
   generating entangled photon pairs at frequencies determined by a frequency of a primary optical source based on determining the plurality of source wavelengths, wherein the frequency of the primary optical source is tuned;
   distributing entangled photon pairs among the plurality of user pairs communicating over a wave division multiplexing network according to frequencies of the entangled photon pairs, wherein a sum of the frequencies of the entangled photon pairs is equal for each user pair;
   establishing a plurality of key exchanges between the plurality of user pairs, wherein establishing the plurality of key exchanges includes repeating generating entangled photon pairs and distributing entangled photon pairs at a plurality of clocked pulses such that each user pair receives a plurality of entangled photon pairs sufficient to establish a photon polarity-based cryptographic key; and
   concurrently controlling the plurality of key exchanges between the plurality of user pairs based on the frequency of the primary optical source.

2. The method recited in claim 1, in which distributing entangled photon pairs among the plurality of user pairs is accomplished via ports of a wave division multiplexing and demultiplexing device.

3. The method recited in claim 1, further comprising segregating a broadband stream of entangled photon pairs into individual wavebands at a plurality of ports serving the plurality of user pairs individually.

4. The method recited in claim 3, further comprising communicating a waveband at each of the plurality of ports.

5. The method recited in claim 1, further comprising establishing a plurality of concurrent key exchanges between selected user pairs of the plurality of user pairs.

6. The method recited in claim 1, in which generating entangled photon pairs is accomplished by parametric down-conversion.

7. The method recited in claim 1, in which generating entangled photon pairs is accomplished by degenerate four-wave mixing.

8. A system comprising:
   a tunable primary optical source adapted to stimulate the generation of entangled photon pairs at a plurality of frequencies based on determining a plurality of source wavelengths, wherein determining the plurality of source wavelengths is based on implementing a maximum number of quantum key distribution connections between a plurality of user pairs concurrently;
   a wave division multiplexing and demultiplexing device adapted to communicate with the tunable primary optical source to distribute a plurality of wavebands to a plurality of user pairs communicating over a wave division multiplexing network, wherein a sum of frequencies of the plurality of wavebands is equal for each user pair, and to establish a plurality of key exchanges between the plurality of user pairs wherein establishing the plurality of key exchanges includes repeating generating entangled photon pairs and distributing entangled photon pairs at plurality of clocked pulses such that each user pair receives a plurality of entangled photon pairs sufficient to establish a photon polarity-based cryptographic key; and
   the tunable primary optical source further adapted to concurrently control the plurality of key exchanges between the plurality of user pairs.

9. The system recited in claim 8, wherein the wave division multiplexing and demultiplexing device is adapted to distribute entangled photon pairs to the plurality of user pairs individually via ports of the wave division multiplexing and demultiplexing device.

10. The system recited in claim 9, wherein the wave division multiplexing and demultiplexing device is adapted to concurrently communicate signals between a user and a plurality of users.

11. The system recited in claim 8, wherein the tunable primary optical source is a tunable laser.

12. The system recited in claim 8, wherein the tunable primary optical source is a multi-frequency source laser.

13. The system recited in claim 8, wherein the tunable primary optical source comprises a plurality of fixed-frequency lasers.

14. A system comprising:
   a tunable primary optical source adapted to pump a nonlinear element;
   the nonlinear element adapted to generate entangled photon pairs at a plurality of frequencies in mathematical relation to a frequency of the tunable primary optical source based on determining a plurality of source wavelengths, wherein the determination of the plurality of source wavelengths is based on implementing a maximum number of quantum key distribution connections between a plurality of user pairs concurrently;
   a wave division multiplexing and demultiplexing device adapted to communicate with the nonlinear element to distribute a plurality of wavebands to a plurality of user pairs communicating over a wave division multiplexing network, wherein a sum of frequencies of the plurality of wavebands is equal for each user pair, and to establish a plurality of key exchanges between the plurality of user pairs, wherein establishing the plurality of key exchanges includes repeating generating entangled photon pairs and distributing entangled photon pairs at plurality of clocked pulses such that each user pair receives a plurality of entangled photon pairs sufficient to establish a photon polarity-based cryptographic key; and
   the tunable primary optical source further adapted to concurrently control the plurality of key exchanges between the plurality of user pairs.

15. The system recited in claim 14, wherein the nonlinear element is adapted to produce entangled photon pairs by parametric down-conversion.

16. The system recited in claim 14, wherein the nonlinear element is adapted to produce entangled photon pairs by degenerate four-wave mixing.

17. A memory containing machine readable instructions for enabling a device to secure communications between a plurality of user pairs communicating over a wave division multiplexing network, which, when executed on a processor, cause the processor to perform operations comprising:

determining a plurality of source wavelengths based on implementing a maximum number of quantum key distribution connections between a plurality of user pairs concurrently;

generating entangled photon pairs at frequencies determined by a frequency of a tunable primary optical source based on determining the plurality of source wavelengths;

distributing a plurality of wavebands to the plurality of user pairs according to frequencies of the entangled photon pairs, wherein a sum of the frequencies of the distributed entangled photon pairs is equal for each user pair;

establishing a plurality of key exchanges between the plurality of user pairs, wherein establishing a plurality of key exchanges includes repeating generating entangled photon pairs and distributing entangled photon pairs at plurality of clocked pulses such that each user pair receives a plurality of entangled photon pairs sufficient to establish a photon polarity-based cryptographic key; and concurrently controlling the plurality of key exchanges between the plurality of user pairs based on the frequency of the tunable primary optical source.

18. A memory containing machine readable instructions for enabling a device to secure communications between a plurality of user pairs communicating over a wave division multiplexing network, which, when executed on a processor, cause the processor to perform operations comprising:

determining a plurality of source wavelengths based on implementing a maximum number of quantum key distribution connections between a plurality of user pairs concurrently;

generating entangled photon pairs at frequencies determined by a frequency of a multi-frequency primary optical source or a plurality of fixed-frequency lasers based on determining the plurality of source wavelengths;

distributing a plurality of wavebands to the plurality of user pairs according to frequencies of the entangled photon pairs, wherein a sum of the frequencies of the entangled photon pairs is equal for each user pair;

establishing a plurality of key exchanges between the plurality of user pairs, wherein establishing the plurality of key exchanges includes repeating generating entangled photon pairs and distributing entangled photon pairs at plurality of clocked pulses such that each user pair receives a plurality of entangled photon pairs sufficient to establish a photon polarity-based cryptographic key; and concurrently controlling the plurality of key exchanges between the plurality of user pairs based on the plurality of frequencies.

* * * * *